United States Patent [19]

Ishikawa et al.

[11] Patent Number: 4,861,128
[45] Date of Patent: Aug. 29, 1989

[54] OPTICAL PICKUP USING A WAVEGUIDE

[75] Inventors: Sachiko Ishikawa, Braunschweig, Fed. Rep. of Germany; Akira Arimoto, Kodaira, Japan

[73] Assignee: Hitachi, Ltd., Tokyo, Japan

[21] Appl. No.: 151,964

[22] Filed: Feb. 3, 1988

[30] Foreign Application Priority Data

Feb. 4, 1987 [JP] Japan ................... 62-22308

[51] Int. Cl.$^4$ .......................... G02B 6/10; G01D 9/00; G11B 7/00
[52] U.S. Cl. ............................. 350/96.13; 350/96.12; 350/96.14; 350/96.18; 350/96.19; 346/33 A; 369/110; 369/112; 369/122
[58] Field of Search ............... 350/96.11, 96.12, 96.13, 350/96.14, 96.15, 96.17, 96.18, 96.19, 370, 374, 377; 346/33 A, 76 L; 369/112, 110, 122

[56] References Cited

U.S. PATENT DOCUMENTS

| | | | |
|---|---|---|---|
| 4,185,256 | 1/1980 | Scifres et al. | 350/96.11 |
| 4,425,023 | 1/1984 | Matsumoto et al. | 350/96.14 |
| 4,694,447 | 9/1987 | Cohen et al. | 369/110 |
| 4,718,052 | 1/1988 | Kondo et al. | 350/96.19 |
| 4,720,824 | 1/1988 | Hayashi | 350/96.14 |
| 4,752,120 | 6/1988 | Shimizu | 350/96.13 X |
| 4,760,568 | 7/1988 | Hine | 369/122 |
| 4,779,259 | 10/1988 | Kono et al. | 369/112 |
| 4,801,184 | 1/1989 | Revelli | 350/96.14 |

FOREIGN PATENT DOCUMENTS

| | | | |
|---|---|---|---|
| 59-107431 | 6/1984 | Japan | 369/122 |
| 61-254910 | 11/1986 | Japan | 350/96.11 X |

OTHER PUBLICATIONS

Buckman, "Polarization-selective lateral . . . " J. Opt Soc. Am. vol. 72, No. 6 6/82, pp. 688-691.
Masuda et al., "An optical waveguide TE-TM Mode splitter . . . " Conf 6th Eur. CONF. on Opt. Comm. 9/80 pp. 264-267.
Ura et al., "An Integrated-Optic Disk . . . " Dept. of Electronics, Osaka Univ. No. 0QE85-72 (no date) pp. 539-546.

Primary Examiner—William L. Sikes
Assistant Examiner—Brian M. Healy
Attorney, Agent, or Firm—Antonelli, Terry & Wands

[57] ABSTRACT

An optical pickup comprising a semiconductor laser, a first waveguide for leading light emitted by the semiconductor laser to recording medium and coupling again light returning from the recording medium; splitting element for separating the light returning from the recording medium from the first waveguide path; and a second waveguide propagating light returning from the recording medium and separated by the splitting element; wherein light going towards the recording medium and light returning from the recording medium propagate separately in the first and the second waveguide so that the utilization efficiency of the light is increased.

18 Claims, 4 Drawing Sheets

OPTICAL PICKUP USING A WAVEGUIDE

BACKGROUND OF THE INVENTION

This invention relates to an optical pickup using a waveguide and in particular to a solid state optical pickup suitable for an optical information recording/reproducing device using optical discs, optical cards, etc. as recording medium.

In a prior art optically integrated optical pickup, elements having functions of light collection, coupling, splitting and light detection are integrated in a waveguide layer, which is a plane single layer, as disclosed in the Journal of the Electronic Communication Society of Japan Optical Quantum Electronic Study Group (OQE) 85-72. In this device a semiconductor laser diode is mounted on an end surface of an optical waveguide so that light emitted by the semiconductor laser diode propagates in an optical waveguide layer and is collected by a focusing grating coupler so as to form a fine light spot on an optical disc, which is recording medium. Light reflected by the optical disc is returned again to the focusing grating coupler and led to the optical waveguide layer. This returned light is splitted and collected by a twin grating focusing beam splitter and propagates in the optical waveguide layer towards 4 photodiodes.

By the prior art construction described above, since both the light going to the optical disc and the light returning therefrom propagate in the optical waveguide path, both the lights must pass through the twin grating focusing beam splitter for leading the returning light to photodetectors. Consequently there is a problem that the light detection efficiency is remarkably reduced.

SUMMARY OF THE INVENTION

A first object of this invention is to provide an optical pickup using a waveguide, having an increased efficiency of utilization of light emitted by a semiconductor laser.

Another object of this invention is to provide an optical pickup having a first waveguide and a second waveguide, through which light going to recording medium and light returning therefrom pass separately.

According to this invention, in an optical pickup having a first waveguide and a second waveguide there are disposed splitting means for splitting light going from a semiconductor laser to recording medium into the two waveguides, elements having functions necessary for each of the lights being mounted separately on each of the first and the second waveguides.

Since the splitting means described above moves the light going from the recording medium to photodetector elements from the first waveguide, through which the light going from the semiconductor laser to the recording medium propagates to the second waveguide, it is possible to dispose twin grating focusing beam splitter means for splitting the returning light towards the photodetector elements and focusing it on the second waveguide. Consequently, since the light going from the semiconductor laser to the recording medium does not pass through the twin grating focusing beam splitter means stated above, loss of light is reduced. Further, also in the case where it is necessary to deflect the light going from the semiconductor laser to the recording medium for the purpose of tracking, etc., by disposing elements having the deflecting function on the first waveguide loss of light is further reduced, because the light returning from the recording medium need not pass through these functional elements.

DESCRIPTION OF THE PREFERRED EMBODIMENTS

Figure 1:
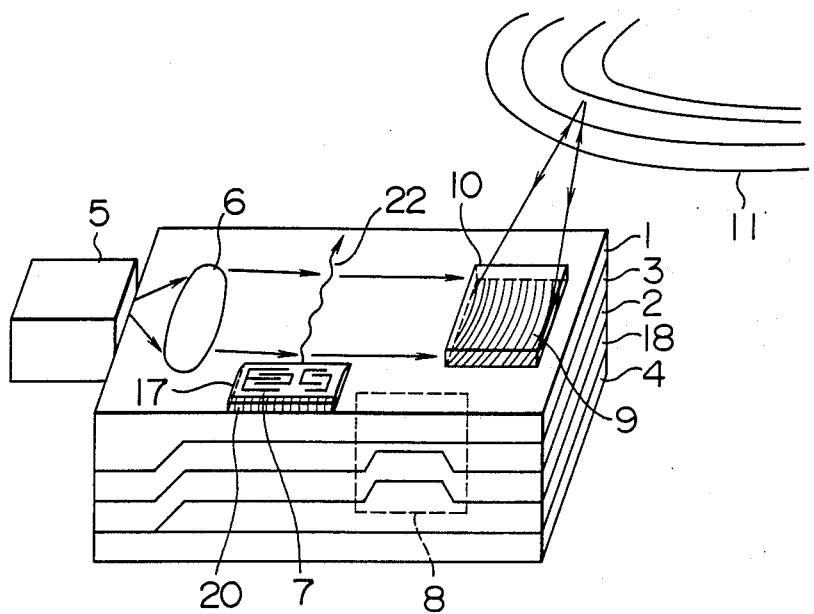
FIG. 1 is a scheme illustrating an embodiment of the optical pickup according to this invention.
Figure 2:
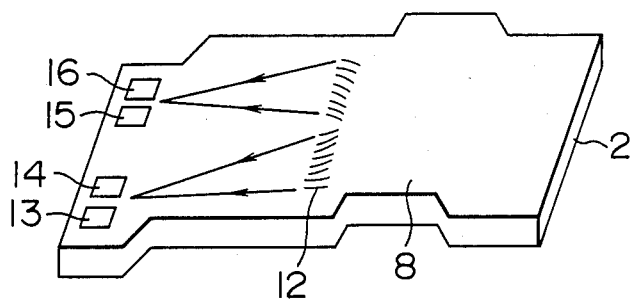
FIG. 2 is a perspective view of the second waveguide layer in the embodiment indicated in FIG. 1.

FIG. 1 is a scheme illustrating an embodiment of the optical pickup according to this embodiment, in which the two waveguides are formed in a two-layered structure, and FIG. 2 shows a part taken out therefrom.

A solid state optical pickup related to this embodiment consists of a first waveguide (waveguide layer) 1 made of dielectric medium for leading light emitted by a semiconductor laser 5 and going to recording medium 11; a second waveguide (waveguide layer) 2 made of dielectric medium for leading light reflected by the recording medium 11 to photodetector elements 13-16; an intermediate layer 3 sandwiched between the first and the second waveguide layers and made of medium having a small refractive index, absorbing hardly light propagating in the two waveguide layers; a substrate 4, or which the layers stated above are formed; and a buffer layer 18 (made of e.g. $SiO_2$, etc.) disposed for the purpose of preventing the absorption of the light propagating in the second waveguide layer 2 by the substrate 4. The first and the second waveguide layers 1 and 2 are made of mediums having propagation mode characteristics different from each other, e.g. combinations such as $SiO_2$—$Ta_2O_5$ and 7059 glass, $As_2S_3$ and Ti doped $LiNbO_3$, GaAs-GaAlAs and $As_2S_3$, etc. On the first waveguide layer 1 there are disposed a waveguide lens 6, a piezo-electric thin film 17, interdigital electrodes 7 mounted on the upper or lower surface of the piezo-electric thin film, sound wave absorbing material 20, and a focusing grating coupler 9. On the upper surface of this focusing grating coupler 9 there is disposed a ¼ wave plate. Further the first waveguide layer 1 and the second waveguide layer 2 as well as the intermediate layer 3 form a TE/TM mode selective direction coupling type beam splitter 8 (mode splitter) and on the second waveguide layer 2 there are disposed photodetector elements (e.g. pn junction type photodiodes, etc.) 13, 14, 15 and 16 for detecting light reflected by the recording medium 11 and led to the second waveguide laye layer 2 by the mode splitter 8. Now the function of these components will be explained.

The first waveguide layer 1 is so formed that its coupling portion with the semiconductor laser 5 is thick so as to have a high light coupling efficiency.

Light emitted by the semiconductor laser 5 propagates in the first waveguide layer 1 towards the recording medium 11 (e.g. an optical disc, an optical card, etc.). At this time, it is necessary to deflect the light in order to make the light track correctly on the recording medium 11. This deflection is realized by exciting e.g. an acoustic surface wave (SAW) 22 in the first waveguide layer. The SAW 22 is excited by applying a voltage having a suitable frequency to the interdigital electrodes 7 disposed on the first waveguide layer 1 and gives rise to a refractive index distribution playing the role of a diffraction grating on the surface of the first waveguide layer 1, which deflects the light. When the frequency applied to the interdigital electrodes 7 is varied, the grating constant of the diffraction grating is varied, which makes it possible to vary the deflection direction of the light. In order to excite the SAW 22 with a high efficiency, there is disposed a thin film 17 made of a piezo-electric material (e.g. ZnO etc.) on the upper or lower side of the interdigital electrodes 7. In the case where the first waveguide layer 1 has satisfactory piezo-electric characteristics, this piezo-electric thin film 17 is unnecessary.

Further, in order to avoid the SAW 22 reflection from the end surface of the first waveguide layer 1 so as to deflect the light suitably, there is disposed sound wave absorbing material 20 (silver paste, etc.) behind the interdigital electrodes 7. Now, if the incident light to the SAW 22 has various angles, deflected light also quits it with virious angles and further its efficiency is lowered. Consequently, in order that the SAW 22 can deflect the light with a high efficiency, it is necessary that the incident light beam is parallel. For this reason, between the semiconductor laser 5 and the excited portion of the SAW 22, there is disposed a waveguide lens 6 for collimating the light. As the waveguide lens 6 a refractive index distribution type lens, a grating lens, a geodesic lens, etc. can be used.

Light deflected with an amount of angle necessary for the tracking by the SAW 22 enters a focusing grating coupler 9. This focusing grating coupler 9 focuses this light on the surface of the recording medium 11 outside of the optical pickup.

At this time, since the light emitted by the semiconductor lens 5 is nearly linearly polarized in the direction of its coupling surface, it is possible that the light propagating in the first waveguide layer 1 contains only TE waves (or TM waves), depending on the arrangement of the semiconductor laser 5. These TE waves (or TM waves) are transformed into circularly polarized light by passing through a ¼ wave plate 10 disposed on the upper surface of the focusing grating coupler 9 and focused on the surface of the recording medium 11. The light reflected by the recording medium 11 passes again through the ¼ wave plate 10 and is transformed into TM waves (or TE waves). Then it is coupled with the first waveguide layer 1 by the focusing grating coupler 9 and enters the mode splitter 8.

Figure 3:
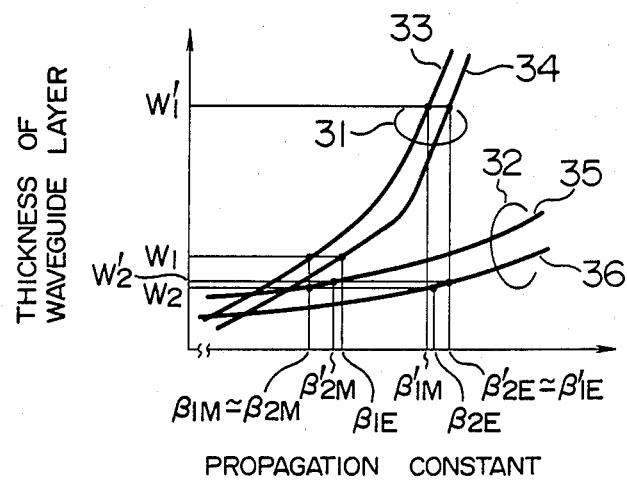
FIG. 3 shows a graph representing the relation between propagation constants of TM and TE waves in the two optical waveguides consisting of two different mediums and the thickness of the optical waveguides.
Figure 4:
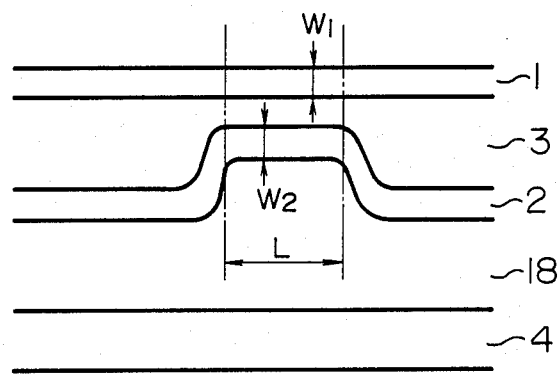
FIG. 4 is a scheme illustrating the construction of the beam splitter portion.

Now the principle, according to which the light is splitted by the mode splitter 8, will be explained by referring to FIGS. 3 and 4.

The waveguide layers 1 and 2 have respective propagation constants for TE and TM waves, which are determined by the material and the thickness thereof. Only the light corresponding to these propagation constants propagates in the waveguide layers. For example, the thickness of the first waveguide layer having characteristics 31 and that of the second waveguide layer having characteristics 32 indicated in FIG. 3 are designated by $W_1$ and $W_2$, respectively. Propagation constants $\beta_{1M}$ and $\beta_{2M}$ for TM waves have values, which are approximately equal to each other. To the contrary propagation constants $\beta_{1E}$ and $\beta_{2E}$ for TE waves differ significantly from each other. When the optical waveguides 1 and 2 are separated sufficiently, there is no transposition of light therebetween. However, when the intermediate layer 3 is thin and the waveguide layers 1 and 2 are sufficiently close to each other as indicated in FIG. 4, the light (TM waves) of a mode having propagation constants close to each other (e.g. $\beta_{1M} \simeq \beta_{2M}$) comes and goes periodically between the waveguide layers 1 and 2, depending on the length of the coupling portion (mode splitter) (L in FIG. 4). Consequently, by choosing a suitable value for L it is possible to realize the perfect transposition of the light (TM waves) from the first waveguide layer 1 to the second waveguide layer 2.

This operation will be explained below more in detail.

At first, suppose that the coupling constants between the first and the second waveguide layers 1 and 2 are represented by $k_E$ and $k_M$ for TE and TM waves, respectively. The coupling constants are determined by the thicknesses of the two waveguide layers and the intermediate layer and the propagation constants of the two waveguide layers. $k_E \simeq 0$ and $k_M \simeq 0$ outside of the mode splitter 8. Suppose that the propagation constants of the two waveguide layers 1 and 2 are represented by $\beta_{1E}$, $\beta_{1M}$, $\beta_{2E}$ and $\beta_{2M}$ for TE and TM waves, respectively and that the thickness of the intermediate layer 3 in the mode splitter 8 is sufficiently small and about 2 times as great as the wavelength. At this time they may be so set that either one of the conditions indicated below is satisfied.

I. Case where TE waves are injected in the first waveguide layer 1 and transposed to the second waveguide layer 2 as TM waves:

$$\begin{cases} |\beta_{1E} - \beta_{2E}| \gg k_E \\ |\beta_{1M} - \beta_{2M}| \simeq 0 \\ L = \pi/k_M \end{cases}$$

II. Case where TM waves are injected in the first waveguide layer 1 and transposed to the second waveguide layer 2 as TE waves:

$$|\beta_{1E} - \beta_{2E}| \simeq 0$$
$$|\beta_{1M} - \beta_{2M}| \gg k_M$$
$$L = \pi/k_E$$

where L designates the length of the mode splitter 8, as stated previously.

The conditions described above will be explained below by referring to FIG. 3, which shows an example of the relation between the thickness of the optical waveguide layers and the propagation constants of light.

Mode characteristics 31 of the first waveguide layer 1 differ from mode characteristics 32 of the second waveguide layer 2. Mode characteristics of the 0-th order TE wave in the two waveguide layers are indicated by 33 and 35 and those of the TM wave are indicated by 34 and 36. In FIG. 3, in order to satisfy the condition I described above, e.g. $W_1$ and $W_2$ are chosen for the thicknesses of the first and the second waveguide layers 1 and 2 so that the propagation constants $\beta_{1M}$ and $\beta_{2M}$ for the TM waves in them are nearly equal and that the difference between the propagation constants $\beta_{1E}$ and $\beta_{2E}$ for the TE waves is sufficiently great with respect to the coupling constant $k_E$. To the contrary, in order to satisfy the condition II, e.g. $W1_1'$ and $W_2'$ may be chosen for the thicknesses of the first and the second waveguide layers 1 and 2 so that the propagation constants $\beta_{1E}'$ and $\beta_{2E}'$ for the TE waves in them are nearly equal and that the difference between the propagation constants $\beta_{1M}'$ and $\beta_{2M}'$ for the TM waves is sufficiently great with respect to the coupling constant $k_M$.

Furthermore, in this embodiment the mode splitter 8 is about 10 mm long; the whole length of the solid state optical pickup is about 30-45 mm; and it is about 5-15 mm wide and about 1-2 mm thick. Therefore according to this invention it is possible to realize a small, light and cheap optical pickup.

Figure 5:
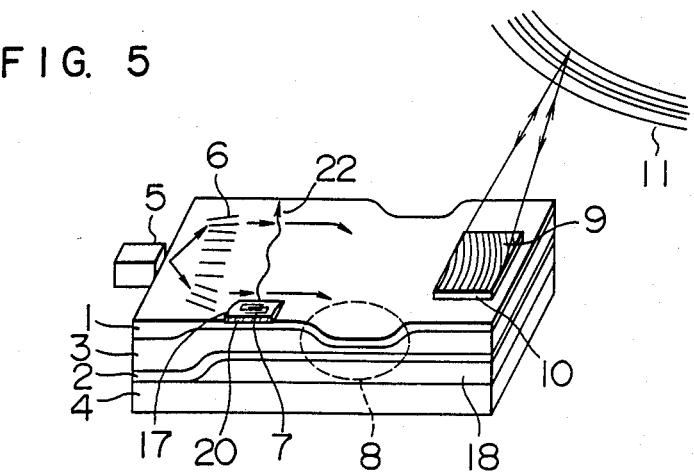
FIG. 5 is a perspective view showing another embodiment of this invention.

Furthermore, according to this invention, as indicated in FIG. 5, it is possible also that in the mode splitter 8 the second waveguide layer 2 is plane and the first waveguide layer 1 is convex towards the second waveguide layer.

Figure 6:
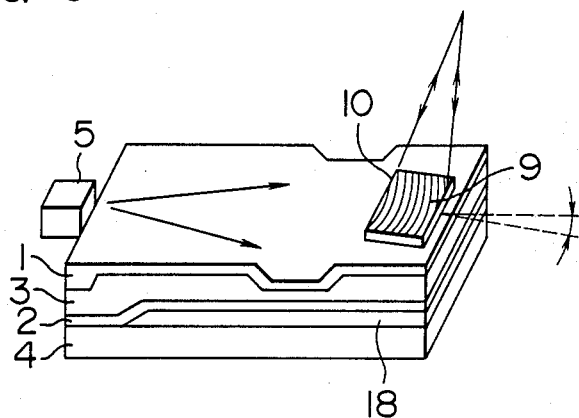
FIG. 6 is a perspective view showing still another embodiment of this invention.

FIG. 6 shows an embodiment, in which the ¼ wave plate 10 in FIG. 5 is slightly inclined. According to this structure it is possible to vary slightly the ratio of TE/TM mode for the light returning from the recording medium 11 to the solid state optical pickup and to regulate the quantity of the light returning to the semiconductor laser 5. That is, when the quantity of the returning light is regulated according to the condition for the quantity of the returning light, under which laser noise is reduced most significantly, a solid state optical pickup using low noise laser light can be realized. Here "laser noise" means a phenomenon, by which the quantity of light emitted from a semiconductor laser fluctuates at random. In the case where the quantity of reflected light is detected as detection signal as in an optical information recording/reproduction device, fluctuations in the laser output give rise to a serious problem. This noise varies remarkably, depending the quantity of the light returning to the light emitting point in the semiconductor laser. The noise is more reduced and the amount of the outputted light is more stable in a state where a suitable amount of light returns thereto than in a state where no light returns thereto. In this embodiment TE wave components (or TM wave components) are left in the returning light by inclining slightly the ¼ wave plate 10 and a suitable amount of light returns to the laser 5 along the first waveguide layer 1 so as to reduce the noise.

Figure 7:
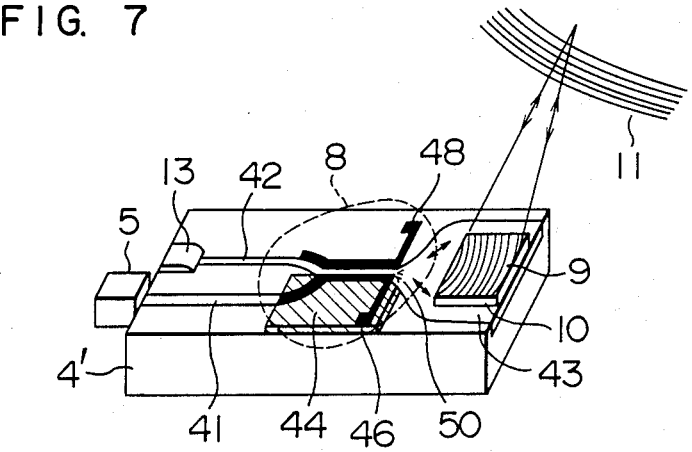
FIG. 7 is a perspective view showing still another embodiment of this invention.

FIG. 7 shows still another embodiment of this invention.

In FIG. 7 an optical pickup consists of a bifurcated waveguide path constituted by a first waveguide path 41 and a second waveguide path 42 formed on an anisotropic piezoelectric crystal substrate 4', a horn type waveguide 43 varying the width of the guided light and the mode splitter 8. The mode splitter 8 consists of the first waveguide path 41 mounted through a buffer layer 44, a first electrode 46 disposed on a part of the extension line thereof and a second electrode 48 disposed, adjacent to the second waveguide path 42.

TM (or TE) waves emitted from the semiconductor laser 5 and coupled with the first waveguide path 41 are widened by a waveguide lens 50, pass through the horn type waveguide 43, and are focused on the surface of the recording medium 11 by the focusing grating coupler 9. At this time the light is circularly polarized by the ¼ wave plate 10. The light returning from the recording medium 11 is TE (or TM) polarized by the ¼ wave plate 10 and injected in the optical pickup by the focusing grating coupler 9. It enters the second waveguide 42, depending on the voltage applied to the mode splitter 8, and the signal is detected by a light sensitive element 13. The tracking and the autofocus are effected by taking out a part of the returning light at a part of the mode splitter 8, which is close to the recording medium 11.

Figure 8:
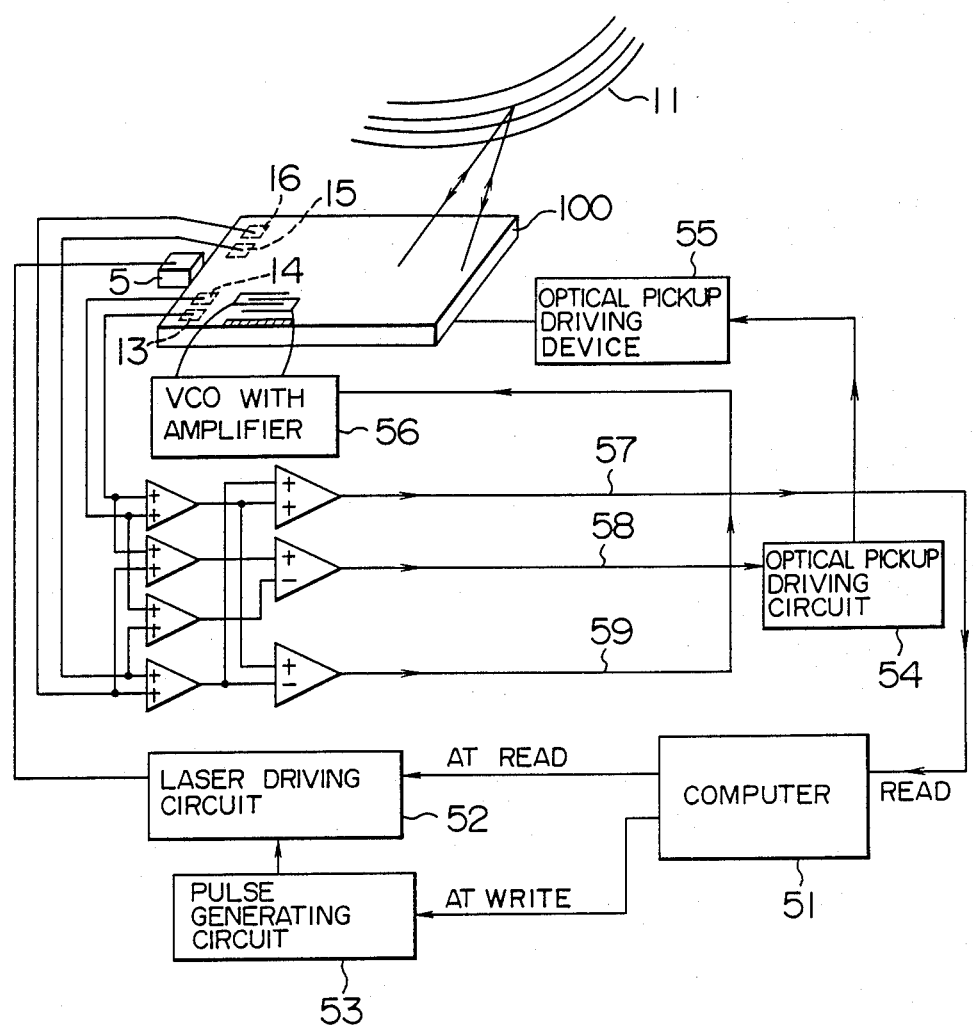
FIG. 8 is a scheme illustrating an information recording device or an information reproducing device using an optical pickup according to this invention.

FIG. 8, shows an embodiment of the optical information recording/reproduction device according to this invention. The optical pickup 100 is same as that indicated in FIGS. 1, 5 or 6.

At the signal reproduction, when a command for signal reproduction is inputted in a computer 51, the semiconductor laser 5 is continuously driven by a laser driving circuit 52. Laser light is led to the recording medium 11 by the optical pickup 100. Reflected light, which is modulated by information recorded on the recording medium 11, is led to photo-detector elements 13–16 formed on the optical pickup 100.

The total quantity of the light detected by the photodetector elements 13–16 is converted to a reproduced signal 57 and sent to a computer 51, where it is reproduced.

A signal corresponding to the difference between the quantity of the light detected by the photodetector elements 13 and 16 and that detected by the photodetector elements 14 and 15 is inputted in a driving circuit as a focus error signal 58. In order to move vertically the optical pickup so as to maintain the distance between the optical pickup 100 and the optical information recording medium 11 at the in-focus distance, the driving circuit 54 stated above sends a control signal to an optical pickup driving device 55.

The signal corresponding to the difference between the quantity of the light detected by the photodetector elements 13 and 14 and that detected by the photodetector elements 15 and 16 is sent to a voltage controlled oscillator (VCO) 56, which is a driver of the SAW deflector, as a tracking signal 59, which varies the frequency of the SAW 22 by using an electric signal applied to the interdigital electrodes 7. When the frequency of the SAW 22 is varied, the deflection direction of the light is varied so as to effect the tracking.

At the signal recording, when a signal to be recorded is inputted in a computer 51, the computer 51 inputs a signal for pulse-oscillating the semiconductor laser 5 with a power greater than for the reproduction according to the signal to be recorded in a pulse generating circuit 53. The pulse generating circuit 53 generates a pulse signal according to this signal and inputs it in a laser driving circuit 52. The laser driving circuit 52 pulse-oscillates the semiconductor laser 5. Light produced by this pulse oscillation is led to the recording medium 11 through the same path as that for the reproduction and forms a pit e.g. by perforating, phase transition, etc. so as to vary reflection characteristics of the recording medium. The tracking and the focus control (autofocus) are effected in the same way as for the reproduction.

Although the embodiment has been described in the above for the case where information is reproduced by using light reflected by the recording medium 11, it is a matter of course that transmitted light may be used therefor. In this case an optical system is necessary for returning the transmitted light to the solid state optical pickup.

Furthermore the focusing (autofocusing) may be effected not only by varying the relative position of the solid state optical pickup to the recording medium 11 as described in this embodiment but also by operating an optical system such as a collecting lens, etc. constructed between the recording medium 11 and a solid state optical pickup.

According to this invention, since it is possible to dispose separately means having functions necessary for propagating light on the two different optical waveguide paths, an effect can be obtained that the utilization efficiency of light emitted by the semiconductor laser can be remarkably increased.

We claim:

1. An optical pickup comprising:
   a semiconductor laser which emits a linearly polarized light;
   a first waveguide for leading light emitted from said semiconductor laser to recording medium recording information and coupling again light returning from said recording medium;
   splitting means comprising a mode splitter for separating said light returning from said recording medium from said first waveguide using its polarization direction; and
   a second waveguide propagating light returning from said recording medium and separated by said splitting means.

2. An optical pickup according to claim 1, wherein said first waveguide includes focusing grating coupler means for focusing light on the surface of said recording medium and coupling light returning from said recording medium.

3. An optical pickup according to claim 1, wherein said first waveguide includes deflecting means for deflecting light going from said semiconductor laser to said recording medium for the purpose of tracking on said recording medium.

4. An optical pickup according to claim 1, wherein said second waveguide includes detector means for detecting light returning from said recording medium.

5. An optical pickup comprising:
   a semiconductor laser;
   a first waveguide for leading light emitted from said semiconductor laser to recording medium recording information and coupling again light returning from said recording medium;
   splitting means for separating said light returning from said recording medium from said first waveguide; and
   a second waveguide propagating light returning from said recording medium and separated by said splitting means, said second waveguide including detector means for detecting light returning from said recording medium and twin grating focusing beam splitter means splitting the light returning from the recording medium towards said detector means and focusing it thereon.

6. An optical pickup according to claim 1, further comprising polarizing means for changing the polarization of the light passing through said first waveguide.

7. An optical pickup according to claim 6, wherein said polarizing means is a ¼ wave plate.

8. An optical pickup according to claim 1, wherein said splitting means separates only a part of light returning from said recording medium from said first waveguide, the remaining part propagating in said first waveguide as it is and returning to said semiconductor laser.

9. An optical pickup comprising:
   a light source emitting linearly polarized light;
   a first waveguide coupled with said light source so as to propagate said linearly polarized light, emitting it towards a recording medium and coupling again light returning from said recording medium;
   a second waveguide superposed on said first waveguide through an intermediate layer; and
   splitting means for taking out light returning from said recording medium from said first waveguide, said splitting means is formed from a portion of said intermediate layer which is thinner than the remaining portion thereof.

10. An optical pickup comprising:
    a semiconductor laser;
    waveguide means coupled with said semiconductor laser so as to propagate light emitted from said semiconductor laser, emit it towards a recording medium and couple again light returning from said recording medium; and
    detector means for detecting light returning from said recording medium; wherein
    said waveguide means comprises a first waveguide and a second waveguide, which are made of materials having different propagation mode characteristics, laminated through an intermediate layer, and
    a mode splitter including a portion of the intermediate layer which is thinner than the remaining portion thereof, which is arranged between the first and second waveguides whereby the light returning from said recording medium is shifted from said first waveguide to said second waveguide.

11. An optical pickup according to claim 10 wherein said first waveguide includes focusing grating coupler means for focusing light on the surface of said recording medium and coupling light returning from said recording medium.

12. An optical pickup according to claim 11, wherein said first waveguide includes deflecting means for deflecting light going from said semiconductor laser to said recording medium for the purpose of tracking on said recording medium.

13. An optical pickup according to claim 12, wherein said second waveguide includes detector means for detecting light returning from said recording medium.

14. An optical pickup according to claim 13, wherein said second waveguide includes twin grating focusing beam splitter means splitting the light returning from said recording medium towards said detector means and focusing it thereon.

15. An optical pickup according to claim 14, further comprising polarizing means for changing the polarization of the light passing through said first waveguide.

16. An optical pickup according to claim 15 wherein said polarizing means is a ¼ wave plate.

17. An optical pickup according to claim 16 wherein said splitting means separates only a part of light returning from said recording medium from said first waveguide, the remaining part propagating in said first waveguide as it is and returning to said semiconductor laser.

18. An optical pickup comprising:

a semiconductor laser;

waveguide means coupled with said semiconductor laser so as to propagate light emitted from said semiconductor laser, emit it towards a recording medium and couple again light returning from said recording medium; and detector means for detecting light returning from said recording medium wherein:

said waveguide means comprises a bifurcated waveguide consisting of a first waveguide and a second waveguide which are kept in contact with each other; and a first electrode is disposed on the first waveguide and a second electrode is disposed adjacent the second waveguide so that by applying a voltage between said electrodes the light returning from said recording medium is shifted from said first waveguide to said second waveguide.

* * * * *